(12) United States Patent
Barot et al.

(10) Patent No.: US 11,346,590 B2
(45) Date of Patent: *May 31, 2022

(54) COOLING SYSTEM

(71) Applicant: OxiCool Inc., Malvern, PA (US)

(72) Inventors: Ravikant T. Barot, Phoenixville, PA (US); Brandon K. Wilcox, Downingtown, PA (US); David Lee Martin, Penn Valley, PA (US)

(73) Assignee: OxiCool Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/309,060

(22) PCT Filed: Jun. 14, 2016

(86) PCT No.: PCT/US2016/037328
§ 371 (c)(1),
(2) Date: Dec. 11, 2018

(87) PCT Pub. No.: WO2017/217970
PCT Pub. Date: Dec. 21, 2017

(65) Prior Publication Data
US 2019/0170418 A1    Jun. 6, 2019

(51) Int. Cl.
| | |
|---|---|
| *F25B 49/04* | (2006.01) |
| *B60H 1/32* | (2006.01) |
| *F25B 17/08* | (2006.01) |
| *F25B 27/02* | (2006.01) |
| *F25B 30/04* | (2006.01) |

(52) U.S. Cl.
CPC ....... *F25B 49/046* (2013.01); *B60H 1/32014* (2019.05); *F25B 17/083* (2013.01); *F25B 27/02* (2013.01); *F25B 30/04* (2013.01); *F25B 2500/06* (2013.01); *F25B 2500/31* (2013.01); *Y02A 30/27* (2018.01); *Y02A 30/274* (2018.01); *Y02B 30/00* (2013.01)

(58) Field of Classification Search
CPC .. F25B 49/046; F25B 17/083; F25B 2500/31; B60H 1/32014
See application file for complete search history.

(56) References Cited

U.S. PATENT DOCUMENTS

| | | | |
|---|---|---|---|
| 1,854,778 A | * | 4/1932 | Boving ................ F25B 17/08 62/145 |
| 3,828,566 A | | 8/1974 | Wetzel |
| 4,171,622 A | | 10/1979 | Yamaguchi et al. |
| 4,610,148 A | | 9/1986 | Shelton |

(Continued)

FOREIGN PATENT DOCUMENTS

WO   WO2016076947   5/2016

OTHER PUBLICATIONS

Office Action dated Mar. 21, 2019 for U.S. Appl. No. 15/714,599 "Cooling Systems and Methods" Barot, 5 pages.

(Continued)

*Primary Examiner* — Christopher R Zerphey
(74) *Attorney, Agent, or Firm* — Lee & Hayes, P.C.

(57) ABSTRACT

Technologies are described herein for cooling systems. In some aspects, a cooling system is configured to enter into a storage configuration or a wintenzation configuration. In the wintenzation configuration, refrigerant used in the cooling system is stored in an adsorbent in an adsorbent chamber.

10 Claims, 10 Drawing Sheets

(56) References Cited

U.S. PATENT DOCUMENTS

| | | | | |
|---|---|---|---|---|
| 4,694,659 | A | * | 9/1987 | Shelton ................. F25B 17/083 62/106 |
| 5,477,706 | A | * | 12/1995 | Kirol ...................... C09K 5/047 62/480 |
| 5,526,648 | A | | 6/1996 | Wertenbach et al. |
| 5,813,248 | A | | 9/1998 | Zornes et al. |
| 5,901,780 | A | * | 5/1999 | Zeigler ................. B60H 1/032 165/42 |
| 5,934,369 | A | | 8/1999 | Dosani et al. |
| 7,266,967 | B2 | * | 9/2007 | Inoue ................... B60H 1/3201 62/238.3 |
| 7,836,723 | B2 | | 11/2010 | Kaufman et al. |
| 9,441,868 | B1 | * | 9/2016 | Barot ...................... F25B 49/04 |
| 9,765,998 | B2 | * | 9/2017 | Barot ...................... F25B 17/08 |
| 9,772,132 | B2 | * | 9/2017 | Barot ...................... F25B 49/04 |
| 9,903,630 | B2 | * | 2/2018 | Barot ...................... F25B 49/04 |
| 2003/0167925 | A1 | * | 9/2003 | Aikawa ............. B60H 1/00492 96/126 |
| 2010/0043462 | A1 | | 2/2010 | Barot et al. |
| 2014/0047853 | A1 | * | 2/2014 | Zhong ...................... B60H 1/14 62/106 |
| 2014/0250927 | A1 | * | 9/2014 | Yoshida ................. F25B 17/083 62/101 |
| 2016/0290696 | A1 | * | 10/2016 | Barot ...................... F25B 27/02 |
| 2016/0327325 | A1 | | 11/2016 | Barot et al. |
| 2017/0051961 | A1 | | 2/2017 | Barot et al. |
| 2018/0003416 | A1 | * | 1/2018 | Barot ................. B60H 1/32014 |
| 2018/0031293 | A1 | * | 2/2018 | Barot ................. B60H 1/32014 |
| 2019/0170418 | A1 | * | 6/2019 | Barot .................... F25B 17/083 |

OTHER PUBLICATIONS

PCT Search Report and Written Opinion dated Feb. 9, 2017 for PCT Application No. PCT/US16/37328, 11 pages.
Office action for U.S. Appl. No. 14/204,920, dated Jun. 7, 2017, Barot, "Cooling Systems and Methods", 6 pages.
Office action for U.S. Appl. No. 15/181,470, dated Oct. 18, 2016, Barot et al., "Cooling System", 11 pages.
Office action for U.S. Appl. No. 14/204,920, dated Oct. 25, 2016, Barot, "Cooling Systems and Methods", 21 pages.
Office action for U.S. Appl. No. 14/681,526, dated Nov. 13, 2015, Barot et al., "Cooling Systems and Methods", 22 pages.
Office action for U.S. Appl. No. 15/136,484, dated Nov. 16, 2016, Barot et al., "Cooling Systems and Methods", 18 pages.
Office action for U.S. Appl. No. 15/707,186, dated Oct. 11, 2019. Barot et al., "Cooling System", 12 pages.
European Office Action dated Apr. 30, 2020 for European Patent Application No. 16734093.4, a counterpart of U.S. Appl. No. 16/309,060, 5 pages.
U.S. Office Action dated Apr. 14, 2020 for U.S. Appl. No. 15/714,599 "Cooling Systems and Methods" Barot, 10 pages.
European Office Action dated Mar. 25, 2022 for European Patent Application No. 16734093.4, a foreign counterpart to U.S. Appl. No. 16/309,060, 12 pages.

\* cited by examiner

COOLING SYSTEM

CROSS REFERENCE TO RELATED APPLICATIONS

This application is a U.S. National Phase Application of International Application No. PCT/US2016/037328, filed Jun. 14, 2016, which is hereby incorporated by reference in its entirety.

BACKGROUND

Conventional cooling systems typically use phase changing refrigerants as the working fluid. The phase changing refrigerants are often compressed and, upon vaporization, absorb heat from the surrounding environment. The absorption of the heat cools the surrounding environment. A plurality of liquid refrigerant systems are hydrofluorocarbon (HFC)-based systems. The refrigerants used in HFC-based systems are greenhouse gases.

Periods in which storage of the HFC refrigerant in the HFC-based system may be necessary and can be handled using conventional methods. HFCs often have very low freezing points that reduce the probability of the freezing of the refrigerant in the system in very low temperature conditions. However, in systems that use other types of refrigerants, such as water, when the ambient temperature around the refrigerant system approaches the freezing point of the refrigerant, there is an increased probability that the refrigerant could freeze in the refrigerant system.

The freezing of the refrigerant in the system can temporarily prevent the system from cooling a space. The frozen refrigerant, if allowed to freeze and expand in various parts of the refrigerant system, can permanently damage the system. Conventional techniques to reduce the probability of refrigerant freezing typically include the use of an additive with a significantly lower freezing point than the refrigerant. However, these additives are often toxic to humans and the environment, at least partially negating the positive effects of using a non-HFC refrigerant. Further, in some systems, additives can contaminate various components of the system, causing a degradation of the operability of the system.

It is with respect to these and other considerations that the disclosure made herein is presented.

SUMMARY

Technologies are described herein for various uses of a crystalline structure of an adsorbent in a cooling system. In some examples, the crystalline structure of an adsorbent is used to place the refrigerant in a form that reduces the probability of the refrigerant freezing in a cooling system. In various examples, the cooling system includes a winterization configuration, a storage configuration, and an in-use configuration. In examples, the storage configuration is a configuration in which substantially all of the refrigerant is to be stored in liquid form in a container. As used herein, "substantially all" means at least 75 percent of the volume of the refrigerant. In some examples, the in-use configuration is a configuration in which the cooling system is being used to cool a target surface or space. As used herein, a target surface or space is the surface or space being cooled by a cooling system (e.g. a house, room, cabin of a vehicle, and the like).

In some examples, the winterization configuration is a configuration in which the system determines that at least a portion of the refrigerant is to be stored within the crystalline structure of an adsorbent. In some examples, the system may have received a temperature input that an ambient air condition around the system may cause at least some of the refrigerant to freeze in the system. Thus, there may be a need to adsorb at least a portion of the refrigerant in an adsorbent to reduce the probability of refrigerant freezing in various components of the system. As used herein, the ambient air is the air surrounding at least a portion of the cooling system. For example, if applied to a vehicle, the target space is the cabin of the vehicle while the ambient air is the outside air surrounding the cooling system.

In examples, the cooling system uses an adsorbent with a crystalline structure capable of adsorbing individual molecules of the refrigerant in the crystalline structure. In some examples, the adsorption of the individual molecules in the crystalline structure can reduce the probability of the freezing of the refrigerant if the system is exposed to temperatures near or below the freezing point of the refrigerant.

The winterization configuration may include various settings that, when a condition is detected that may cause refrigerant freezing, causes the cooling system to adsorb the refrigerant at a predetermined rate. In some examples, the system includes one or more temperature inputs. The temperature input receives temperature data. The temperature data is used by the system to determine a condition of the ambient air around the system in which the refrigerant may need to be stored in the winterization configuration rather than a storage configuration, i.e., stored by adsorbing the refrigerant in the adsorbent rather than as a liquid in a container.

In some examples, the cooling system includes an evaporator fluidly coupled to an adsorption chamber. In a cooling mode, the refrigerant vaporizes, causing the evaporator to absorb heat. The adsorption chamber receives the refrigerant vapor. The adsorption chamber includes an adsorbent. The adsorbent adsorbs the refrigerant vapor in the crystalline structure of the adsorbent. In a recharging mode, heat is applied to the adsorbent, causing desorption of the refrigerant from the adsorbent. In some examples, more than one evaporator and/or adsorbent chamber can be used to maintain at least a portion of the cooling system in a cooling mode while allowing a recharging mode.

In some examples, there is a cooling system comprising at least one evaporator containing a refrigerant, at least one adsorbent chamber fluidly coupled to the at least one evaporator and containing adsorbent configured to provide adsorption of vaporized refrigerant from the at least one evaporator in a cooling mode and configured to provide desorption of the refrigerant to the at least one evaporator in a recharging mode, and a control system configured to control the adsorption and desorption of the refrigerant of the at least one adsorbent chamber between the cooling modes and recharging modes during a cooling cycle, wherein at the end of the cooling cycle the control system is programmed to cease desorption of the refrigerant from the at least one adsorbent chamber, allow adsorption of the vaporized refrigerant from the at least one evaporator and at the end of the adsorption cycle continue to maintain the at least one adsorbent chamber in an adsorbed state in a winterization configuration.

In some examples, there is a cooling system comprising at least one evaporator containing a refrigerant, at least two adsorbent chambers fluidly coupled to the at least one evaporator and each containing adsorbent configured to provide adsorption of vaporized refrigerant from the at least one evaporator in a cooling mode and configured to provide desorption of the refrigerant to the at least one evaporator in a recharging mode, and a control system configured to control the adsorption and desorption of the refrigerant of the at least two adsorbent chambers, the control system being programmed to alternate the at least two adsorbent chambers between the cooling modes and recharging modes to maintain substantially continuous adsorption of the vaporized refrigerant from the at least one evaporator during a cooling cycle, wherein at the end of the cooling cycle the control system is programmed to cease desorption of the refrigerant from the at least two adsorbent chambers, allow adsorption of the vaporized refrigerant from the at least one evaporator and at the end of the adsorption cycle continue to maintain the at least two adsorbent chambers in an adsorbed state in a winterization configuration.

In some examples, a method is described comprising using a vehicle to heat at least one adsorbent chamber to cause desorption of the refrigerant from the adsorbent following a winterization configuration and before a subsequent cooling cycle. In some examples, the method further comprises automatically entering the winterization configuration when a temperature sensor senses a predetermined ambient air temperature. In some examples, the cooling system includes at least two adsorbent chambers and the method further comprises controlling the adsorption and desorption of the refrigerant of the at least two adsorbent chambers between the cooling modes and recharging modes to maintain substantially continuous adsorption of the vaporized refrigerant from the at least one evaporator during a cooling cycle. In some examples, during the winterization configuration, the ambient temperature of the air is about or below the freezing point of the refrigerant. In some examples, substantially all of the refrigerant is adsorbed within the adsorbent in the winterization configuration.

The crystalline structure of the adsorbent can be used to place the refrigerant in a form for other uses as well. For example, the structure can be used to place the refrigerant in a stable, secure form for transport. In some examples, when transported as a liquid, the weight of the refrigerant can move or shift when the carrier transporting the refrigerant moves. In some examples, placing the refrigerant in the crystalline structure of the adsorbent can stabilize the weight of the refrigerant, as the adsorbent acts to prevent movement of the refrigerant when adsorbed in the crystalline structure of the adsorbent.

This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
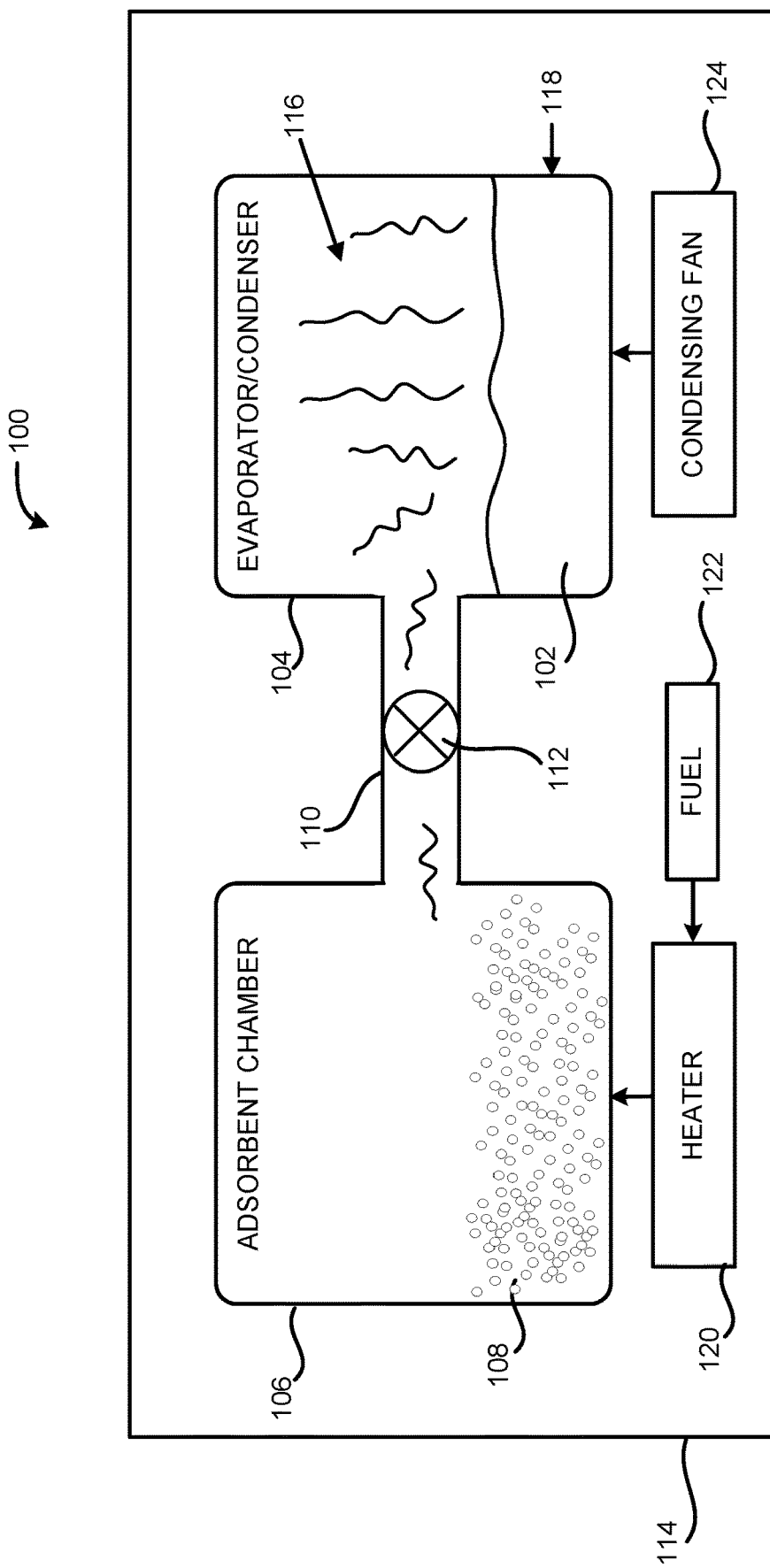
FIG. 1 is an illustration of a cooling system.

The following detailed description is directed to various uses of a crystalline structure of an adsorbent in a cooling system. In some examples, the crystalline structure of an adsorbent is used to place the refrigerant in a form that reduces the probability of the refrigerant freezing in a cooling system. For example, the adsorbent can be zeolite. It should be understood that, while various examples described herein are described in terms of the use of zeolite, the presently disclosed subject matter is not necessary limited to zeolite, as other suitably equipped adsorbents, including, but not limited to, molecular sieves, metal organic frameworks, and electrically activated adsorbents, may be used. In some examples, electrically activated adsorbents, such as activated charcoal, can be adsorbents configured with an electrical charge to adsorb molecules. In some examples, the adsorbent is designed and/or selected to allow for the storage of the refrigerant on a molecular basis. For example, the crystalline structure of common forms of zeolite provide for the adsorption of a water molecule within the interstitial space in the crystalline structure of the adsorbent.

Adsorbing the refrigerant on a molecular basis can provide various advantages. In some examples, because the water molecules are stored (adsorbed) separately within the interstitial spaces of the adsorbent, the water molecules are not able to join and do not have a state of either liquid, vapor, or ice. Thus, in some examples, cooling systems using certain combinations of crystalline adsorbent and refrigerant can withstand relatively lower temperatures than other cooling systems without the use of antifreeze agents.

In the following detailed description, references are made to the accompanying drawings that form a part hereof, and in which are shown by way of illustration specific examples. Referring now to the drawings, aspects of technologies for cooling systems will be presented.

FIG. 1 is an illustration of a cooling system 100. In some examples, the cooling system 100 is a closed-loop system, whereby the volume working fluid (refrigerant) is maintained within the cooling system 100. The cooling system 100 includes a refrigerant 102 contained within an evaporator/condenser 104. In some examples, the refrigerant 102 is water. In some examples, the refrigerant 102 is pure water. In some examples, the refrigerant 102 is substantially pure water. In some examples, the refrigerant 102 is water containing no additives. In other systems, water containing adjuvants may be desired as the refrigerant 102. An example of useful adjuvants is an anti-microbial (e.g., bactericidal or fungicidal) composition. In some examples, the refrigerant 102 does not contain materials which would interfere with operation of cooling system 100 in its operation. Thus, in some examples, glycols and other antifreeze agents can be excluded from the refrigerant 102, at least in amounts effective for storing cooling system 100 in ambient conditions around or below the freezing point of the refrigerant 102.

In some examples, evaporator/condenser 104 is fluidly coupled to an adsorbent chamber 106 containing an adsorbent 108. In some examples, adsorbent 108 is a material configured to adsorb and desorb the refrigerant 102. In some examples, the adsorbent 108 is configured to provide adsorption of vaporized refrigerant 116 from the evaporator/condenser 104 in a cooling mode (illustrated in FIG. 1) and configured to provide desorption of the refrigerant 102 back into the evaporator/condenser 104 in a recharging mode.

In some examples, the adsorbent 108 exhibits a high ability to adsorb refrigerant 102 and to remain in an adsorbed state over practical lengths of time, while maintaining physical and physicochemical form and function. Such materials may be useful when they exhibit a high ability to adsorb water, efficient and effectively reversible desorption of water upon application of heat energy, and physical and physicochemical stability during and following repeated adsorption and desorption cycles.

In some examples, the adsorbent 108 includes a desiccant material. In some examples, the adsorbent 108 is a desiccant. In some examples, the adsorbent 108 is zeolite. A zeolite may be described as, but without limitation, hydrous aluminum silicate in porous granules. Exemplary zeolites that may be used include analxime, chabazite, heulandite, natrolite, phillipsite and stilbite. In some examples, the adsorbent 108 is any drying agent that maintains its physical structure when substantially fully contacted with water. In other examples, the adsorbent 108 is any adsorptive and/or absorptive material including but not limited to diatomaceous earth, activated alumina, silica gel, calcium aluminosilicate clay, molecular sieves (e.g., electrically charged molecular sieves), metal organic framework materials, activated carbon, and/or lithium chloride. In other examples, the adsorbent 108 may be an electrically chargeable and dischargeable material (e.g., a porous slab or particles of material such as a metal including aluminum, stainless steel and alloys thereof) such that electrical energy is used to control the electrical charge of the pores of the material to adsorb and desorb the refrigerant 102 from the adsorbent 108.

The evaporator/condenser 104 is fluidly coupled to the adsorbent chamber 106 via a fluid passageway 110 such as a pipe or conduit. In one example, the fluid passageway 110 includes a valve 112 that controls the fluid coupling between the evaporator/condenser 104 and the adsorbent chamber 106. In one example, the evaporator/condenser 104 and the adsorbent chamber 106 are contained within a common housing 114. In other examples, the housing 114 includes two or more parts. In some examples, the refrigerant 102 is hermetically sealed within the cooling system 100.

In some examples, the valve 112 can be a thermally actuated valve that opens the passageway 110 between the evaporator/condenser 104 and the adsorbent chamber 106 when a calibrated temperature is reached. In some examples, this can allow the refrigerant water to be adsorbed and the system to enter a winterization configuration. In some examples, the valve 112 may be actuated using a bi-metallic coil, plate, diaphragm, as well as an impregnated wax element and other temperature reacting technologies. These technologies can convert a temperature change into mechanical energy to move the valve 112. In further examples, the actuation mechanism for the valve 112 may have a high temperature opening setting to operate the system and provide cooling, as well as a low temperature setting to initiate a winterization mode.

During the cooling mode, a heat transfer medium 118 is passed over, around and/or through evaporator/condenser 104 to form a heat exchanger coupling between heat transfer medium 118 and the evaporator/condenser 104. The heat transfer medium 118 may be any suitable media to be cooled or used to cool another medium. Heat transfer medium 118 may be the environment to be cooled directly. In other examples, the heat transfer medium 118 may be used to extend the heat exchange with the evaporator/condenser 104 to another area (e.g., a living room or sleeping space) or media or surface. In some examples, the heat transfer medium 118 is air. In some examples, the heat transfer medium 118 is water. In some examples, the heat transfer medium 118 includes glycol mixtures or other antifreeze agents, oils, or heat transfer media.

As the vaporized refrigerant 116 moves from the evaporator/condenser 104 into the adsorbent chamber 106, the pressure within the evaporator/condenser 104 decreases reducing the boiling point of the refrigerant 102 and causing it to evaporate, thereby decreasing the temperature within the evaporator/condenser 104, pulling heat from heat transfer medium 118 such that the temperature of the heat transfer medium 118 decreases.

During use, the vaporized refrigerant 116 is adsorbed into the adsorbent 108. To reset or recharge cooling system 100 and be ready for a subsequent cooling cycle, energy is applied to the adsorbent chamber 106 to cause the adsorbed refrigerant 102 to desorb from the adsorbent 108 and flow back into the evaporator/condenser 104. In some examples, a heater 120 having a fuel source 122, or other heat source, is used to apply heat to the adsorbent 108 in the recharging mode. In some examples, a condensing fan 124 is used to condense the desorbed refrigerant for subsequent cycles. In some examples, a fan is used to blow ambient air around evaporator/condenser 104 to condense the desorbed refrigerant from vapor to liquid for subsequent cycles. It should be understood, however, that some examples of the cooling system 100 do not require the condensing fan 124, as the desorbed refrigerant may condense in the evaporator/condenser 104 based on the temperature of the refrigerant as well as the pressure in the evaporator/condenser 104. In some examples, a chiller or other cooling source may be used.

Figure 2:
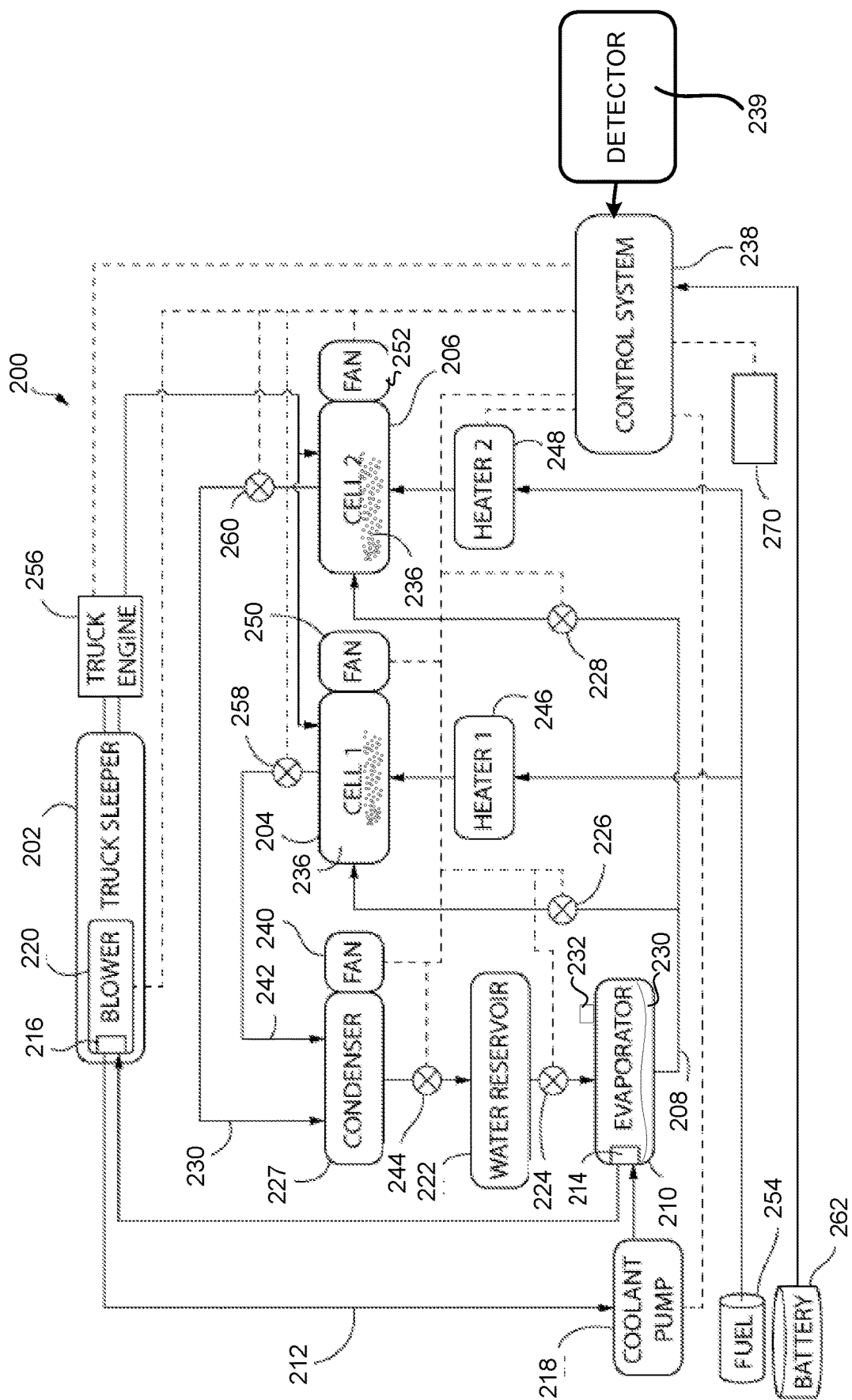
FIG. 2 is an illustration of a cooling system capable of continuous cooling.

FIG. 2 is an illustration of a cooling system 200 capable of continuous cooling. In FIG. 1, because the cooling system includes only a single adsorbent chamber 106 and evaporator/condenser 104, once the refrigerant is adsorbed into the adsorbent 108 to a predetermined level, the adsorbent 108 needs to undergo a desorption cycle. The desorption cycle (e.g. recharging mode) essentially takes the cooling system 100 offline because there is no other adsorbent available to adsorb refrigerant. The cooling system 200 of FIG. 2 alleviates that limitation by providing an additional adsorbent chamber/evaporator/condenser combination.

In FIG. 2, the cooling system 200 is being used to cool a space such as a sleeping or passenger compartment 202 of a truck while a driver sleeps as illustrated. However, the cooling system 200 may be configured to cool any desirable space or media or surface. The cooling system 200 may provide continuous cooling by including two or more adsorbent chambers 204, 206 that alternate between the cooling modes and recharging modes to maintain substantially continuous adsorption of the vaporized refrigerant 208 from the evaporator 210 during a cooling cycle. In some examples, a cooling cycle is continued so long as at least one of the adsorbent chambers 204, 206 is adsorbing vaporized refrigerant 208 from the evaporator 210. In some examples, heat transfer medium 212 is coupled to the evaporator 210 via a first heat exchanger 214. In some examples, the evaporator 210 absorbs heat from the heat transfer medium 212 via the first heat exchanger 214 and desirably maintains the heat transfer medium 212 below a desired temperature during the cooling cycle.

In some examples, the heat transfer medium 212 is used to cool a desired space such as the passenger compartment 202 through a second heat exchanger 216. In some examples, the passenger compartment 202 is generally enclosed. In some examples, the passenger compartment 202 is a room such as a sleeper compartment or passenger compartment of a vehicle or a room of a house, or a liquid such as drinking water or beer. In some examples, the heat transfer medium 212 is moved between the first heat exchanger 214 and the second heat exchanger 216 by a pump 218.

In some examples, the second heat exchanger 216 includes a fan 220. In some examples, the fan 220 helps to distribute cooled air within the passenger compartment 202. In some examples, the cooling system 200 includes a reservoir 222. In some examples, the reservoir 222 is configured to contain a refrigerant (illustrated in FIG. 1) in liquid form. In some examples, the reservoir 222 is fluidly coupled to the evaporator 210. In some examples, a valve 224 is disposed within and configured to control the fluid coupling between the evaporator 210 and the reservoir 222. In some examples, the evaporator 210 is fluidly coupled to the first adsorbent chamber 204. In some examples, a valve 226 is disposed within and configured to control the fluid coupling between the evaporator 210 and the first adsorbent chamber 204.

In some examples, the evaporator 210 is fluidly coupled to the second adsorbent chamber 206. In some examples a valve 228 is disposed within and configured to control the fluid coupling between the evaporator 210 and the second adsorbent chamber 206. In some examples, the evaporator 210 is fluidly coupled to two or more adsorbent chambers 204, 206. In other examples, additional adsorbent chambers and evaporators may be provided in various configurations. In some examples, a condenser 227 is omitted. In other examples, the condenser 227, the reservoir 222 and the evaporator 210 are combined into a single device, as illustrated in FIG. 1. In some examples, a condenser 227 and a reservoir 222 are combined into a single device and valve 244 is omitted.

Figure 4:
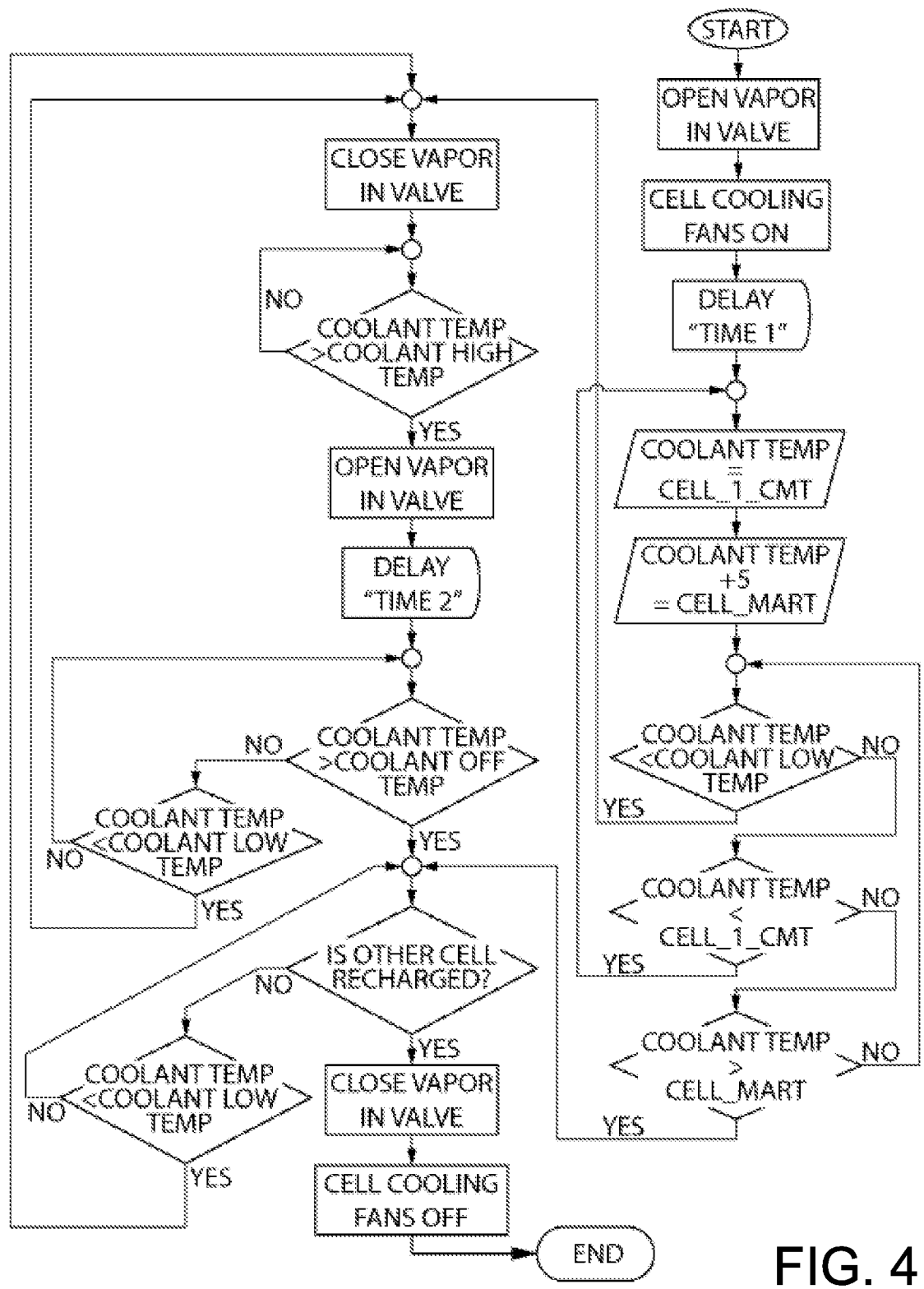

Referring to FIG. 4, because the heat transfer medium 212 may eventually reach a temperature where a refrigerant 230 in the evaporator 210 begins to freeze potentially damaging the structural integrity (e.g., a hermetic seal) of the evaporator 210, a temperature sensor 232 may be provided. It should be understood that the location of the temperature sensor 232 may vary. One or more valves 226, 228, 224 may be closed or partially closed to slow or stop adsorption into adsorbent 236 and further cool the refrigerant 230 based on the sensed temperature. In other examples, one or more valves 226, 228, 224 are opened to reduce the temperature of the evaporator 210 if the heat transfer medium 212 exceeds a predetermined temperature.

In some examples, valves 226, 228, 224 are binary. In other examples, valves 226, 228, 224 are adjustable to different amounts of openness between ON and OFF. In some examples, a control system 238 controls valves 226, 228, 224. In some examples, the control system 238 controls valves 226, 228, 224 to maintain the heat transfer medium 212 between a predetermined temperature range (e.g., approximately 52.5° F. to approximately 53.0° F.). In some applications, it may be desirable to have the temperature of the evaporator 210 go to a temperature lower than the approximate freezing temperature of the refrigerant 230. In such instances, rather than keeping a particular quantity of the refrigerant 230 in the evaporator 210 at all times, only the quantity required to be adsorbed into the adsorbent 236 (e.g., a spray at a time) is fed into the evaporator 210.

In some examples, the valve 224 controls the amount of the refrigerant 230 introduced into the evaporator 210. In some examples, the valve 224 is controlled to feed the refrigerant 230 into the evaporator 210 at approximately the same rate the refrigerant 230 is leaving the evaporator 210. In other examples, an injector, such as a sprayer, is used to inject the refrigerant 230 into the evaporator 210. Controlling the amount of the refrigerant 230 entering the evaporator 210 may allow the evaporator 210 to go to a lower than the freezing temperature of the refrigerant 230 with reduced or no risk of freezing damage because the quantity of the refrigerant 230 introduced into the evaporator 210 at any given time is too low to cause damage.

In other examples, the evaporator 210 may have a high thermal conductivity. For example, the evaporator 210 may include a liner that is thermally conductive. Providing an evaporator with a high thermal conductivity may help to more quickly transfer heat from the outside of the evaporator 210 to the inside of the evaporator 210 to melt or prevent ice droplets from forming on the inside of the evaporator 210.

In some examples, the first adsorbent chamber 204 is fluidly coupled to a condenser 227. In some examples, the second adsorbent chamber 206 is fluidly coupled to the condenser 227. In some examples, the condenser 227 includes a fan 240 configured to cool vaporized refrigerant 242 exiting the first and second adsorbent chambers 204, 206. In some examples, air is used to cool the condenser 227. In other examples, water or another liquid is used to cool the condenser 227. In some examples, the condenser 227 is fluidly coupled to the reservoir 222. In some examples, the condensed refrigerant 230 is transferred from the condenser 227 into the reservoir 222. In some examples, a valve 244 is disposed within and configured to control the fluid coupling between the condenser 227 and the reservoir 222. In some examples, a single condenser 227 is provided for two or more adsorbent chambers 204, 206. In other examples, each adsorbent chamber 204, 206 is fluidly coupled to its own condenser 227.

In some examples, a first heater 246 is thermally coupled to the first adsorbent chamber 204. In some examples, the first heater 246 is configured to heat the first adsorbent chamber 204 to a sufficient temperature to cause refrigerant within adsorbent 236 of the first adsorbent chamber 204 to desorb from the adsorbent 236 in the recharging mode. In some examples, the first adsorbent chamber 204 is thermally coupled to a fan 250 configured to cool the first adsorbent chamber 204 following the desorbing or recharging mode and prior and/or during an adsorbing or cooling mode. In some examples, a second heater 248 is thermally coupled to the second adsorbent chamber 206. In some examples, the second heater 248 is configured to heat the second adsorbent chamber 206 to a sufficient temperature to cause refrigerant within the adsorbent 236 of the second adsorbent chamber 206 to desorb from the adsorbent 236 in the recharging mode. In some examples, the second adsorbent chamber 206 is thermally coupled to a fan 252 configured to cool the second adsorbent chamber 206 following the desorbing or recharging mode and prior and/or during an adsorbing or cooling mode. In some examples, the first and second heaters 246, 248 are powered by a fuel source 254. The fuel source 254 may include any desirable fuel including natural gas, diesel, liquefied petroleum, heating oil, jet propellant, liquid propane, solar energy, geothermal energy and/or a battery. In some examples, an additional heat source 256, such as the exhaust from a combustion engine (e.g., the combustion engine of a vehicle using cooling system 200) or other waste heat, may be thermally coupled to one or more of the first and second adsorbent chambers 204, 206 in the recharging modes. In some examples, a single fan is provided to cool first and second adsorbent chambers 204, 206. In some examples, a single heater is provided to heat first and second adsorbent chambers 204, 206.

In some examples, the refrigerant 230 is moved within cooling system 200 only as a result of the adsorption in and desorption from the adsorbent 236. In some examples, controlling one or more valves 224, 226, 228, 244, 258, 260 and heaters 246, 248, 256 moves the refrigerant 230 through cooling system 200 without the assistance of one or more pumps. In other examples, one or more pumps are provided to assist with moving the refrigerant 230 within cooling system 200.

In some examples, cooling system 200 includes the control system 238. In some examples, control system 238 includes one or more computers having one or more processors and memory (e.g., one or more nonvolatile or volatile storage devices). In some examples, memory or computer readable storage medium of memory stores programs, modules and data structures, or a subset thereof for a processor to control and run the various systems and methods disclosed herein. In some examples, a non-transitory computer readable storage medium having stored thereon computer-executable instructions which, when executed by a processor, perform one or more of the methods disclosed herein.

In some examples, the control system 238 is electronically coupled to and configured to control the operation of one or more valves 224, 226, 228, 244, 258, 260 to control the fluid coupling between various components of the cooling system 200. In some examples, the control system 238 is electronically coupled to and configured to control the operation of one or more fans 220, 240, 250, 252 to cool various components of the cooling system 200. In some examples, the control system 238 is electronically coupled to and configured to control the operation of heaters 246, 248, 256.

In some examples, the control system 238 is powered by a power source 262. In some examples, the power source 262 is a battery. In some examples, the power source 262 is powered by the fuel source 254. In some examples, the power source 262 is a thermoelectric generator. In some examples, the control system 238 is programmed to control the adsorption and desorption of the refrigerant 230 of the adsorbent chambers 204, 206 and alternate adsorbent chambers 204, 206 between the cooling modes and recharging modes to maintain substantially continuous adsorption of vaporized refrigerant 208 from the evaporator 210 during a cooling cycle.

In some examples, at the end of the cooling cycle, the control system 238 is programmed to cease desorption of the refrigerant 230 from adsorbent chambers 204, 206, allow adsorption of vaporized refrigerant 208 from the evaporator 210 and at the end of the adsorption cycle continue to maintain the at least two adsorbent chambers in an adsorbed state in a winterization configuration. The term "winterization" as used herein is not used to limit the configuration based on a temperature, but rather, is used to define a configuration in which the refrigerant is to be adsorbed within the adsorbent for a purpose other than general use of the cooling system 200, such as transportation of an uninstalled system. In a winterization configuration, the molecules of the refrigerant 230 are stored on an individual basis within the structure of the adsorbent 236. In the examples using zeolite, a molecule of water (if used as the refrigerant 236) is adsorbed within a void of the crystalline structure of the zeolite.

In some examples, the cooling system 200 is a closed loop system that can detect a condition requiring a winterization configuration. In those examples, upon detecting the condition, the cooling system 200 is reconfigured to place the system in a winterization configuration whereby the molecules of the refrigerant are adsorbed into the adsorbent individually.

Figure 3:
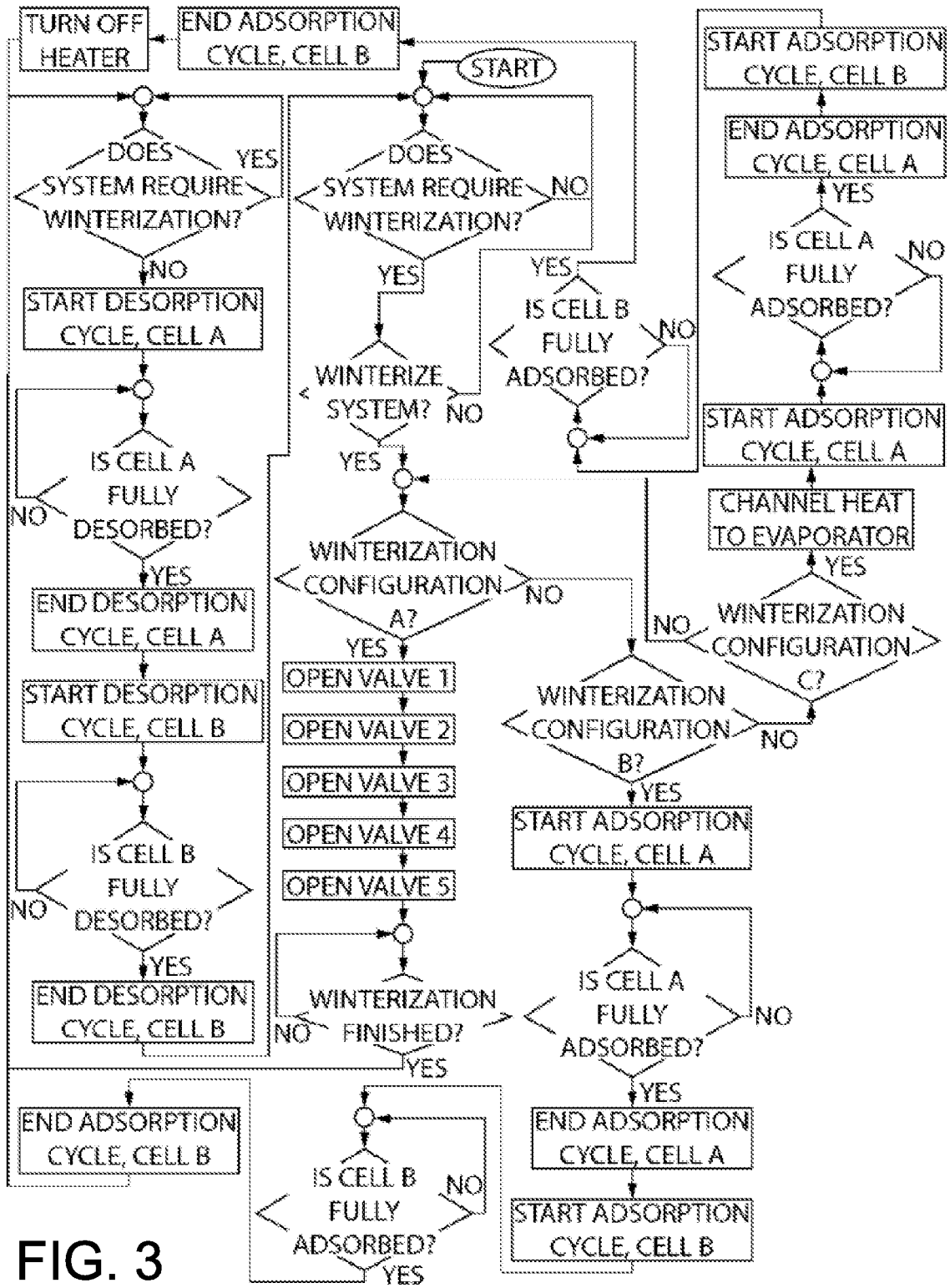
FIGS. 3-5 are flow charts illustrating the operation of a cooling system.
Figure 5:
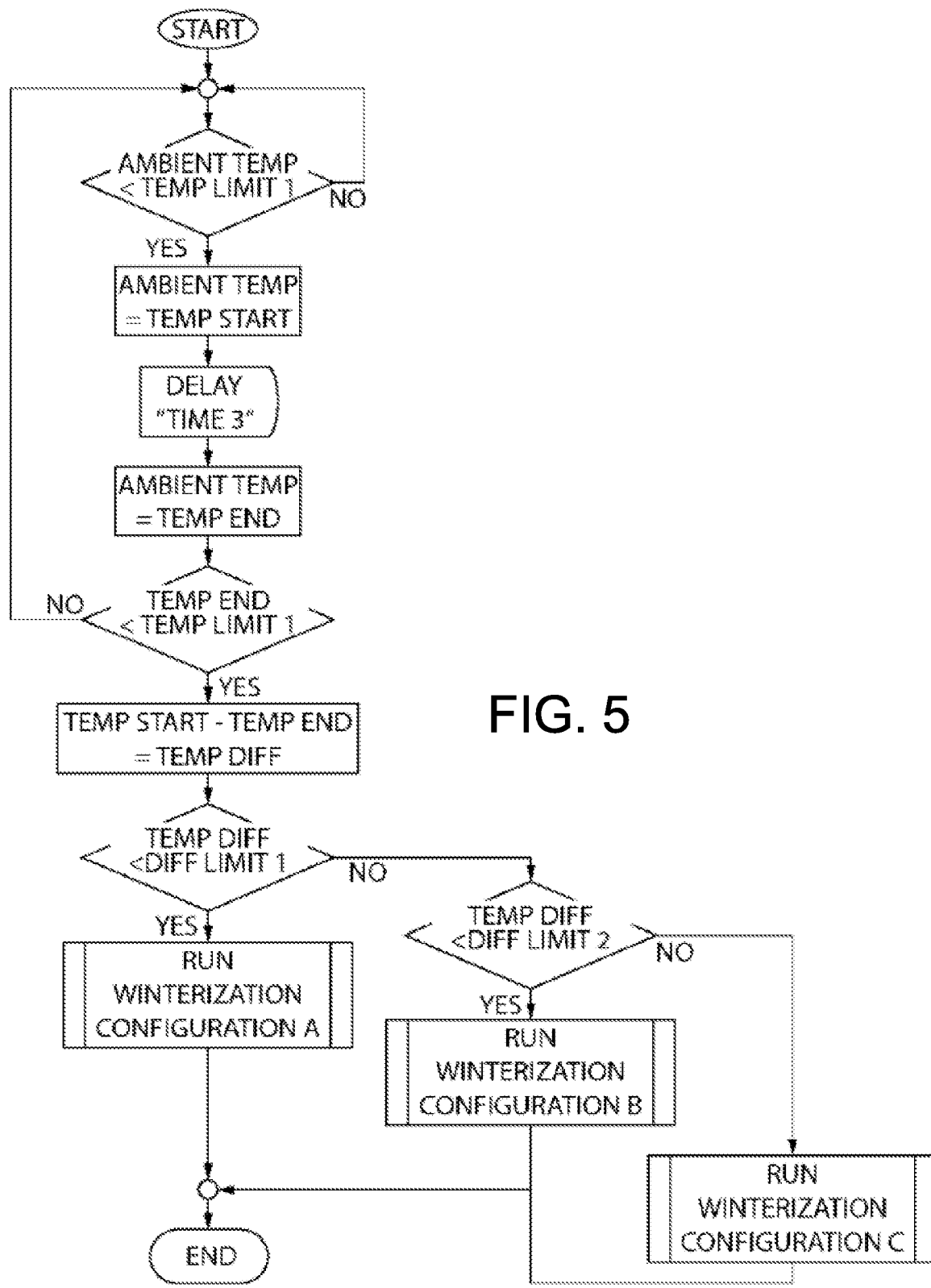

Described in reference to FIGS. 3-5, the cooling system 200 may be entered into the winterization configuration in a variety of ways. FIG. 3 is a flow chart outlining three exemplary methods. Referring to FIG. 3, the "winterization configuration a" may be achieved by opening valves 1-5 corresponding to valves 224, 226, 228, 258, 260 shown in FIG. 2. The "winterization configuration b" may be achieved by adsorbing a portion of the refrigerant 230 in the first adsorbent chamber 204 and then subsequently adsorbing substantially all of the remaining portion of the refrigerant 230 in the second adsorbent chamber 206. The "winterization configuration c" may be achieved by the same method as winterization configuration b with the addition of applying additional heat to the evaporator 210 to accelerate adsorption. Certain storage configurations may be faster than others but may use more energy.

The control system 238 and/or a user may therefore decide which winterization configuration is optimal to use for a given situation. Referring to FIG. 5, for example, the control system 238 may automatically enter into one of a plurality of winterization configurations based on how quickly the ambient temperature is changing. In some examples, the control system 238 monitors the ambient temperature (e.g., using sensor 270 or receive information from a weather report). When the ambient temperature falls below a predetermined limit, the control system 238 will record that current temperature. After a predetermined delay, the control system 238 will record what the ambient temperature changes to and compare what the difference is to the initial recorded temperature.

The control system 238 will then decide, based on how quickly the temperature changed, which winterization configuration is the most optimal to use. For example, if the temperature is dropping slowly (e.g., less than a predetermined value ("limit 1" in FIG. 5)) then the control system 238 may utilize "winterization configuration a" by opening valves 1-5 corresponding to valves 224, 226, 228, 258, 260 shown in FIG. 2. If the temperature is dropping more quickly (e.g., greater than a first predetermined value ("limit 1" in FIG. 5) and less than a second predetermined value ("limit 2" in FIG. 5)) then the control system 238 may utilize "winterization configuration b" by adsorbing a portion of the refrigerant 230 in the first adsorbent chamber 204 and then subsequently adsorbing a remaining portion of the refrigerant 230 in the second adsorbent chamber 206.

If the temperature is dropping even more quickly (e.g., more than a predetermined value ("limit 2" in FIG. 5)) then the control system 238 may utilize "winterization configuration c" by the same method as winterization configuration b with the addition of applying additional heat to evaporator 210 to accelerate adsorption. In some examples, the user of cooling system 200 selects (e.g., from a control panel or other control such as a cellular phone) certain commands for the control system 238 to execute. For example, user selects or programs when the cooling cycle should start, when the cooling cycle should end, whether to automatically recharge cooling system 200 when waste heat is available, and/or whether or not to enter the storage configuration at the end of the cooling cycle.

The control system 238 may be programmed to automatically enter the storage configuration or the winterization configuration. In some examples, the control system 238 is programmed to enter the storage configuration or the winterization configuration at the end of the cooling cycle. In some examples, the control system 238 is programmed to enter the storage configuration at the end of the cooling cycle unless the user selects otherwise. In some examples, The control system 238 is programmed to enter the storage configuration or the winterization configuration at a predetermined time (e.g., at 6:00 am or on October 1st) or as a result of a predetermined condition (e.g., the engine of the vehicle has been off for over 12 hours or cooling system 200 has not been used for two weeks), or at the end of each cooling cycle. In some examples, the control system 238 includes the sensor 270. In some examples, the sensor 270 is a temperature sensor.

In some examples, the sensor 270 is a global positioning system (GPS). In some examples, the sensor 270 is a pressure sensor. In some examples, the sensor 270 is an altimeter. In some examples, the control system 238 automatically enters cooling system 100 into the winterization configuration when the sensor 270 senses below a predetermined ambient air temperature, air pressure, altitude and/or geographic location. For example, between cooling cycles if the temperature the sensor 270 senses a predetermined ambient air temperature (e.g., 10° Celsius), the control system 238 could open valves 226, 228 and/or apply heat to the evaporator 210 such that substantially all of the refrigerant 230 is adsorbed in adsorbent chambers 204, 206.

In some examples, a detector 239 may be provided. In some examples, the detector 239 is a detector that detects a condition of the cooling system 200 that may require the cooling system 200 to be placed in a winterization configuration. For example, the detector 239 detects if components of the cooling system 200 are disconnected, possibly exposing the refrigerant 230 to the atmosphere. In some examples, the detector 239 and the sensor 270 can perform the functions of each other, whereby only a sensor 270 or a detector 239 is used. In other examples, the detector 239 and the sensor 270 can perform different detection functions.

In some examples, the control system 238 is programmed to automatically recharge cooling system 100 and desorb the refrigerant 230 from at least one of the adsorbent chambers 204, 206 when the sensor 270 senses above a predetermined ambient air temperature. For example, when cooling system 200 is in the winterization configuration and the temperature the sensor 270 senses a predetermined ambient air temperature (e.g., 15° Celsius), the control system 238 cause one or more heaters 246, 248, 256 to apply heat to one or more adsorbent chambers 204, 206 so that cooling system 200 is recharged and ready for a subsequent cooling cycle.

In some examples, the control system 238 is programmed to automatically enter cooling system 100 into the winterization configuration based on actual or forecasted weather conditions. For example, the control system 238 may receive input from a weather report and if the temperature is or forecasted to be near or below a predetermined temperature value, the control system 238 enters cooling system 200 into the winterization configuration following use of cooling system 200, or if not in use, automatically enter cooling system 200 into the storage configuration at a predetermined time.

In some examples, the control system 238 enters cooling system 200 into the winterization configuration by opening one or more valves 226, 228. In some examples, eventually substantially all of the refrigerant 230 is adsorbed into adsorbent chambers 204, 206 even if the pump 218 is off. In some examples, the control system 238 enters cooling system 200 into the storage configuration by keeping the adsorbent chambers 204, 206 adsorbed at the end of the cooling cycle.

In some examples, the cooling system 200 is run through a standard adsorption cycle, using heat from passenger compartment 202 to heat the heat transfer medium 212 and speed up the evaporation in the evaporator 210 and therefore speed up adsorption of the refrigerant 230 into adsorbent chambers 204, 206. In such an example, the recharging mechanism, the heaters 246, 248, 256 would be disengaged so that when each adsorbent chamber 204, 206 is fully adsorbed, cooling system 200 would not go into a recharging mode. Cooling system 200 would remain the winterization configuration until one or more heaters 246, 248, 256 were used to desorb water from adsorbent chambers 204, 206 to recharge cooling system 200.

In some examples, the control system 238 enters cooling system 200 into the winterization configuration by applying additional heat to the evaporator 210. Additional heat could be applied to the evaporator 210 by one or more of heaters 246, 248 used for recharging adsorbent chambers 204, 206 or additional heat source 256 such as heat from a truck engine or other waste heat.

In some examples, the control system 238 is coupled to a remote control, such a device connected to the control system 238 through a wireless communication system or through the interne, so that a user can input commands remotely (e.g., using a smart phone). In other examples, the control system 238 is hard wired to a remote controlled device. In some examples, the user can adjust the operating and programmed parameters using a remote controlled device. In some examples, actual ambient conditions or weather forecasts can be presented to the user (e.g., using an application or app) and the user can select or program commands for entering cooling system 200 into a storage configuration. For example, an app can alert the user via an app on the user's smart phone that "the temperature in Pittsburgh (current location) is predicted to be below freezing overnight. Do you want to enter the winterization configuration at the end of the cooling cycle?". The user may be driving with the cooling system 200 to a warmer climate where temperatures are predicted to be well above freeze and may therefore select "no" in response to the question.

In some examples, the control system 238 is programmed to use additional heat source 256 to exit the storage configuration and desorb refrigerant from at least one of the adsorbent chambers 204, 206. In some examples, the control system 238 is programmed to use additional heat source 256 to desorb refrigerant from at least one of the adsorbent chambers 204, 206 regardless of whether the cooling system 200 is in the storage configuration. For example, after a cooling cycle, cooling system 200 is stopped with one or both adsorbent chambers 204, 206 in at least partially adsorbed state. Between cooling cycles, waste heat from additional heat source 256 may be available (e.g., the driver is done sleeping in passenger compartment 202, cooling system 200 is off, and driver begins driving the truck creating heat from the exhaust of the engine).

The heat from additional heat source 256 may be used to desorb refrigerant from one or both adsorbent chambers 204, 206 to reset cooling system 200 for a subsequent cooling cycle and saving fuel from fuel source 254. In some examples, the use of additional heat source 256 to desorb one or more adsorbent chambers 204, 206 between cooling cycles may be turned off, either automatically or selectively, if cooling system 200 is to remain in the winterization configuration. In other examples, waste energy (e.g., energy captured from braking of a vehicle) may be used to at least partially recharge fuel and/or energy sources 254, 262.

Figure 6:
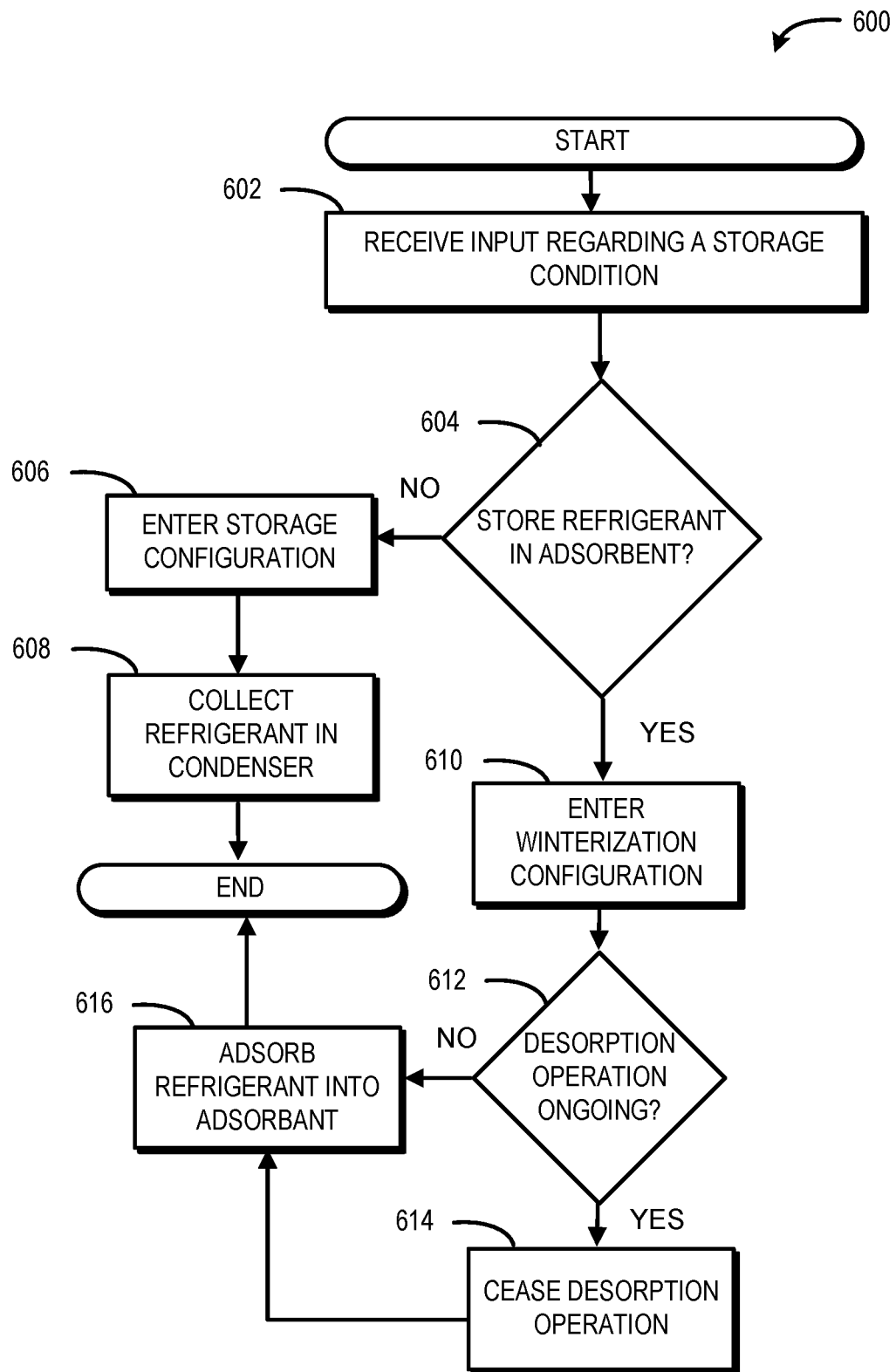
FIG. 6 is a flow chart illustrating a method for operating a cooling system in either a storage configuration or a winterization configuration.

Turning now to FIG. 6, aspects of a method 600 for operating a cooling system, such as the cooling system 200, will be described in detail. It should be understood that the operations of the method 600 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 600 can be ended at any time and need not be performed in its entirety. Some or all operations of the method 600, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, electronic control units, electronic control modules, programmable logic controllers, minicomputers, mainframe computers, personal computers, hand-held computing devices, microprocessor-based, programmable consumer electronics, combinations thereof, and the like. In some examples, instructions can be provided by a logic hard wired or hard encoded control system using relays, transistors, mosfets, logic gates, and the like. Computer-storage media does not include transitory media.

Thus, it should be appreciated that the logical operations described herein can be implemented as a sequence of computer implemented acts or program modules running on a computing system, and/or as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. For purposes of illustrating and describing the technologies of the present disclosure, the method 600 disclosed herein is described as being performed by the control system 238 and appropriate components of the cooling system 200 via execution of computer executable instructions. As such, it should be understood that the described configuration is illustrative, and should not be construed as being limiting in any way.

The method 600 begins at operation 602, where an input is received regarding a storage condition. As used herein, a "storage condition" is a condition in which the refrigerant within the cooling system is to be stored. As used herein, "storage" does not include a temporary condition in which a refrigerant has been adsorbed within an adsorbent during the operation of a cooling system. For example, a cooling system that uses multiple adsorbent chambers may have one chamber actively adsorbing refrigerant and another chamber undergoing a desorption process (recharging). The adsorption/desorption cycle during use is not considered a "storage condition" as used herein.

The purpose of storing the refrigerant within the cooling system may vary. For example, as noted above, the ambient air around the cooling system may be, or soon may be, at a temperature that may increase the probability of the freezing of the refrigerant within various components of the cooling system, possibly damaging the cooling system. In other examples, the cooling system may be placed into a temporary or extended period of non-use. In these and other examples, the refrigerant may need to be removed from various components of the cooling system to, among other possibilities, protect the integrity of the cooling system or the refrigerant itself. The presently disclosed subject matter is not limited to any particular reason for the storage condition.

The method 600 continues at operation 604, where a determination is made as to whether or not to store the refrigerant in the adsorbent. In many conventional cooling systems, the refrigerant is typically stored in liquid form in one or more containers, such as an evaporator or a condenser. However, various examples of the presently disclosed subject matter provide for refrigerant storage within the adsorbent itself. In some examples, the refrigerant may be preferably stored in the adsorbent rather than a reservoir such as the evaporator or the condenser. As mentioned above, the adsorbent/refrigerant combination may be selected so that the refrigerant is stored within the crystalline structure of the adsorbent.

For example, a zeolite/water combination may be used. During the adsorption process, a water molecule is adsorbed into a volumetric space provided by the crystalline structure of the zeolite. Because the water molecule is adsorbed separately from other water molecules, during relatively low temperature conditions (such as those below the freezing point of water), the water molecule may not have the ability to combine with other water molecules to form a crystalline structure. Thus, in low temperatures, the use of the adsorbent as the storage medium may reduce the probability of ice formation within the cooling system.

Another example in which it may be preferable to store the refrigerant in the adsorbent rather than in liquid form is the relative stability of the refrigerant. In liquid form, movement of the container can cause movement of the refrigerant if in liquid form. This may cause changes in weight distribution, noise, or other disturbances that may not be acceptable. When adsorbed in an adsorbent, the adsorbed water molecules may move a negligible amount if the adsorbent chamber is moved, thus alleviating issues that can be caused by liquid refrigerant moving within a container.

The method 600 continues to operation 606, where if the refrigerant is not to be stored in the adsorbent, the cooling system enters a storage configuration. In the storage configuration, various components of the cooling system are aligned so that the refrigerant may be collected in a particular container. In the example of FIG. 6, the container is the condenser. The method 600 continues to operation 608, where the refrigerant is collected in the condenser.

As noted above, in some examples, various operations of the method 600 may not be performed or may be performed in various orders. For example, in some examples, the method 600 may temporarily cease after operation 606 and not re-enter an operational mode. In these examples, the refrigerant may be stored in a disconnected configuration to protect the refrigerant in cases of transportation or unintended disconnect of various components of the cooling system. Once collected, the method 600 may thereafter end.

If the refrigerant is to be stored in the adsorbent, the method 600 continues to operation 610, where the cooling system enters the winterization configuration. Examples of winterization configurations are provided above with respect to FIGS. 3-5. In the winterization configuration, the cooling system is aligned so that the refrigerant outside of one or more adsorbent chambers is adsorbed into the adsorbent.

The method 600 continues to operation 612, where a determination is made as to whether or not a desorption operation is ongoing. As noted above, a purpose of the winterization configuration is to cause the adsorption of the refrigerant within the adsorbent.

The method 600 continues to operation 614, where in response to a determination that a desorption operation is ongoing, the cooling system ceases the desorption operation. In some examples, ceasing the desorption operation includes placing the adsorbent back into a condition for adsorbing (e.g. cooling the adsorbent).

The method 600 continues to operation 616, where in response to a determination that a desorption operation is not ongoing or after operation 614, the cooling system adsorbs the refrigerant into the adsorbent. The refrigerant may remain adsorbed within the adsorbent until the storage condition clears or another input is received to place the system back into an operational mode. The method 600 thereafter ends.

In some examples, it may be desirable to communicate with more than one cooling system. For example, a trucking company may want to provide their fleet of vehicles with temperature data. The temperature data may be used by the cooling system to determine, among other possibilities, if the refrigerant is to be stored in the adsorbent in an adsorbent chamber.

Figure 7:
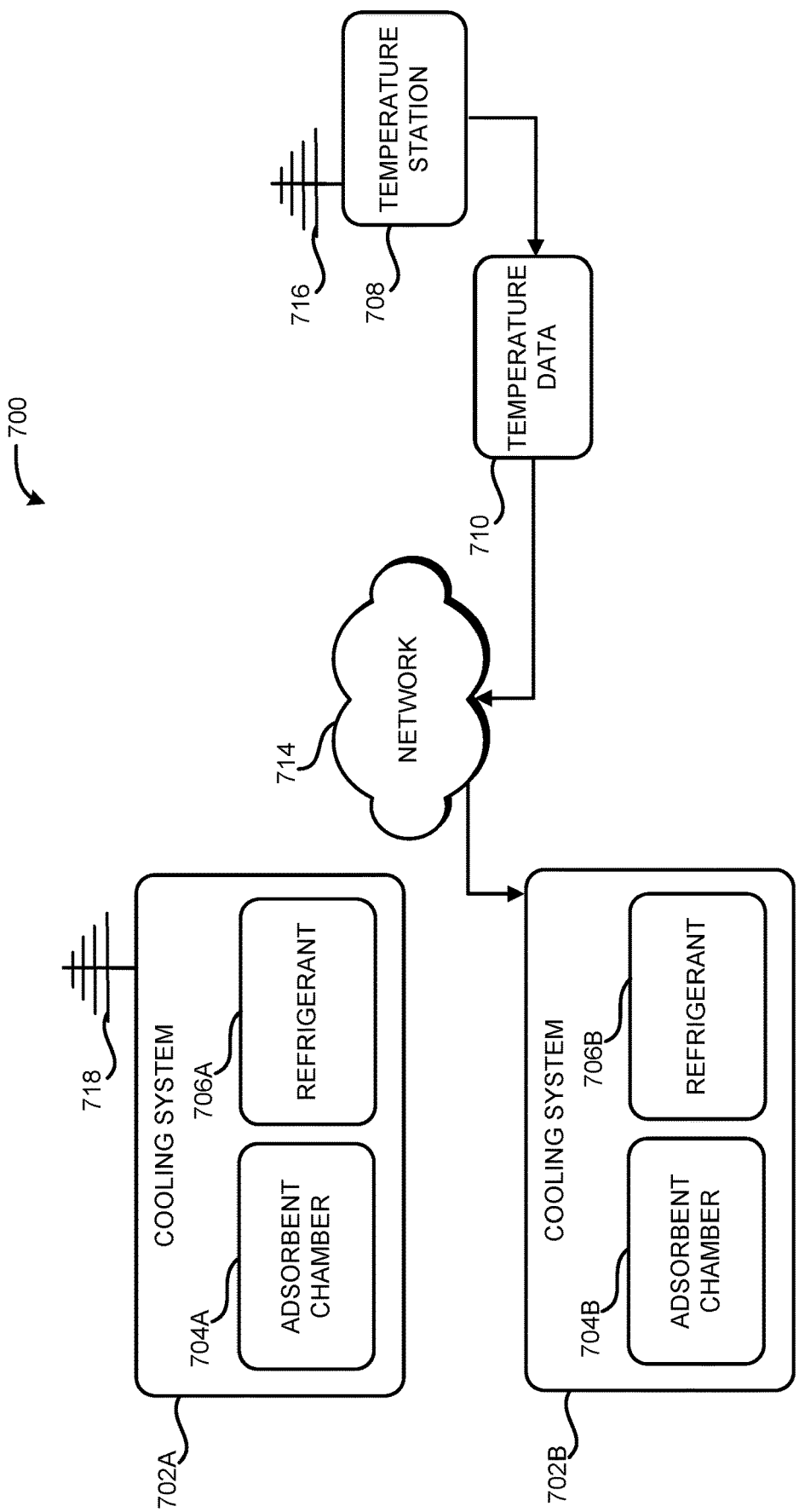
FIG. 7 is an illustration of a system for communicating temperature data to a plurality of cooling systems.

FIG. 7 is an illustration of a system 700 for communicating temperature data to a plurality of cooling systems. Illustrated in FIG. 7 are cooling systems 702A and 702B. The cooling systems 702A and 702B may be installed in various locations such as trucks, houses, and the like. The presently disclosed subject matter is not limited to any particular location. Further, the cooling system 702A may have a different use or configuration than the cooling system 702B. For example, the cooling system 702A may be installed to provide cooling to a house, whereas the cooling system 702B may be installed on a truck.

The cooling system 702A includes an adsorbent chamber 704A having an adsorbent disposed therein (not illustrated). The cooling system 702A further includes a refrigerant 706A operable to be adsorbed by the adsorbent within the adsorbent chamber 704A. In a similar manner, the cooling system 702B includes an adsorbent chamber 704B having an adsorbent disposed therein (not illustrated). The cooling system 702B further includes a refrigerant 706B operable to be adsorbed by the adsorbent within the adsorbent chamber 704B.

A temperature station 708 provides temperature data 710. The temperature station is in communication with the cooling systems 702A and 702B through network 714. In some examples, the network 714 may be a wireless network, such as a cellular network, whereby the temperature station 708 may use a transceiver 716 to communication with the cooling systems 702A and 702B. The cooling system 702A may use transceiver 718 to receive the temperature data 710. In other examples, the network 714 may be a wired network, whereby the cooling system 702 receives the temperature data 710 using a LAN or other wired connection. It should be understood, however, that the presently disclosed subject matter is not limited to any particular manner of communication.

Figure 8:
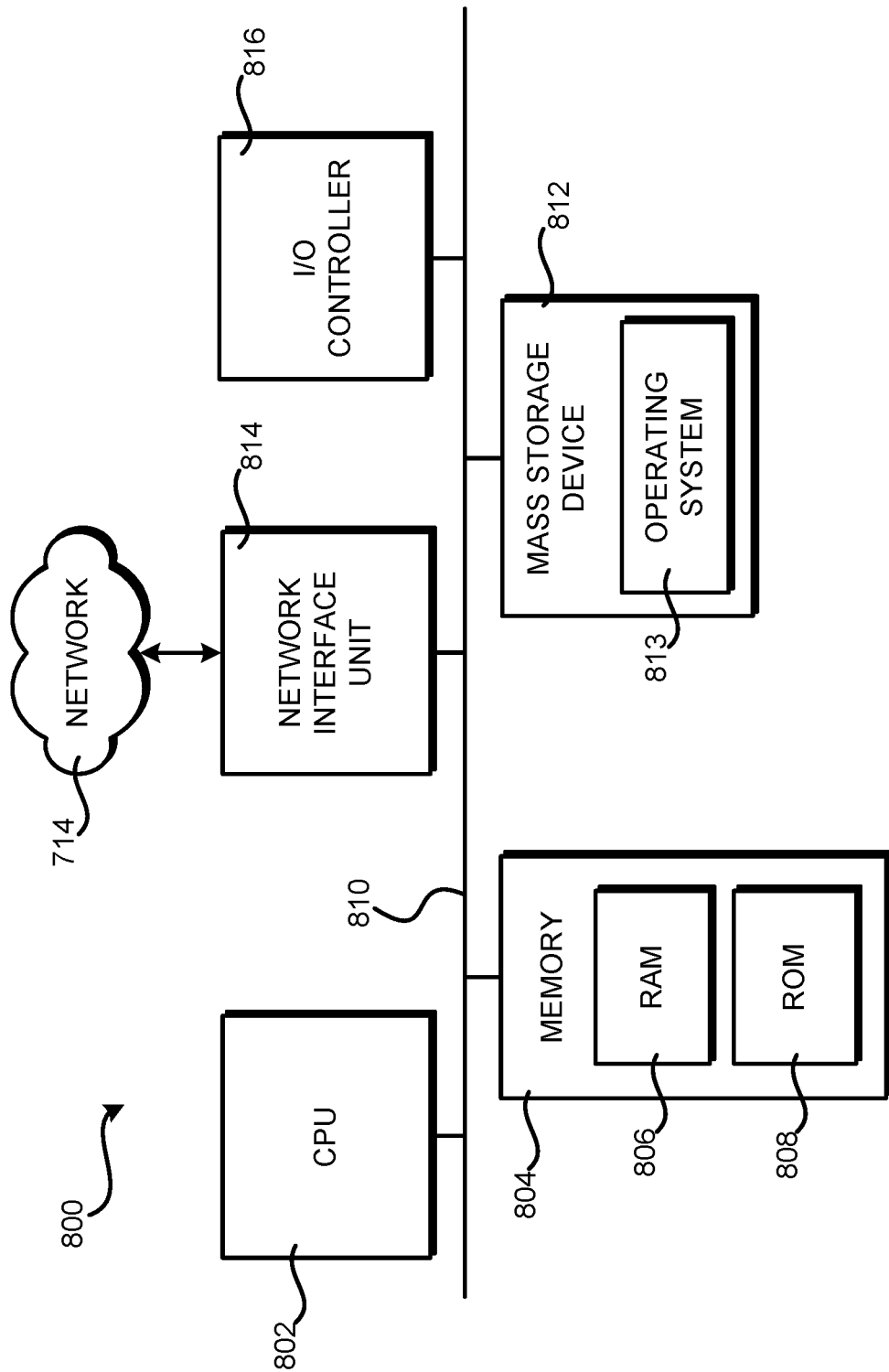
FIG. 8 is a computer architecture diagram illustrating an illustrative computer hardware and software architecture for a computing system capable of implementing aspects presented herein.

FIG. 8 illustrates an illustrative computer architecture 800 for a device capable of executing the software components described herein for operating a cooling system to cause the cooling system to enter a storage configuration or a winterization configuration. Thus, the computer architecture 800 illustrated in FIG. 8 illustrates an architecture for a server computer, mobile phone, a smart phone, a desktop computer, a netbook computer, a tablet computer, and/or a laptop computer. The computer architecture 800 may be utilized to execute any aspects of the software components presented herein. In some examples, the computer architecture can include the control system 238 of FIG. 2.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 813 and one or more application programs for operating a cooling system.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, a "computer storage medium" or "computer-readable storage medium," and variations thereof, do not include waves, signals, and/or other transitory and/or intangible communication media, per se. For the purposes of the claims, "computer-readable storage medium," and variations thereof, refers to one or more types of articles of manufacture.

According to various configurations, the computer architecture 800 may operate in a networked environment using logical connections to remote computers through a network such as the network 714. The computer architecture 800 may connect to the network 714 through a network interface unit 814 connected to the bus 810. It should be appreciated that the network interface unit 814 also may be utilized to connect to other types of networks and remote computer systems. The computer architecture 800 also may include an input/output controller 816 for receiving and processing input from a number of other devices, including a keyboard, mouse, or electronic stylus (not shown in FIG. 8). Similarly, the input/output controller 816 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Figure 9:
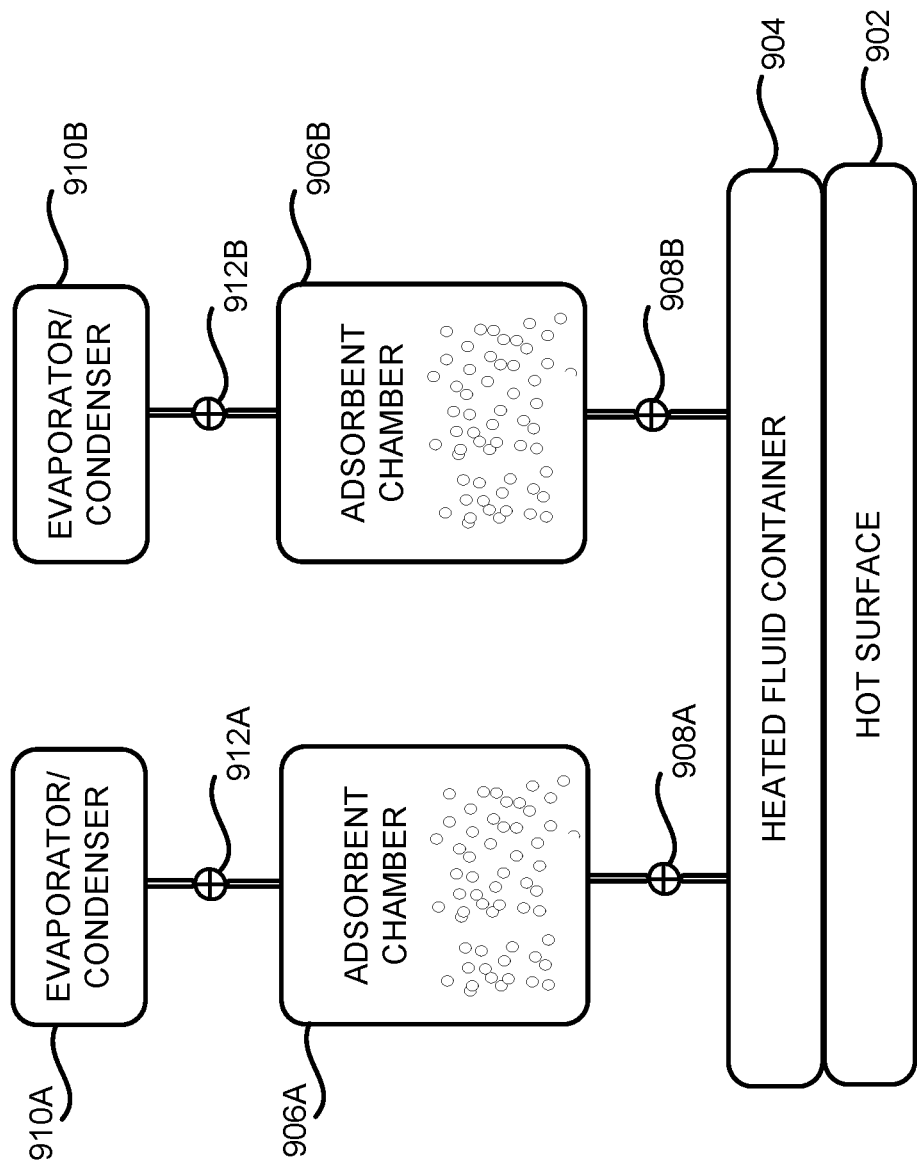
FIG. 9 is an illustration of a hot surface cooling system.

In some examples, a cooling system may be used to cool a surface rather than a fluid. FIG. 9 is an illustration of a cooling system 900. The surface cooling system 900 includes a hot surface 902. During use, the hot surface 902 typically generates heat. The amount of heat, if not removed, can destroy or damage the hot surface 902. Thus, the heat may need to be removed from the hot surface 902 to maintain the integrity of the hot surface 902. The hot surface 902 may have a physical interface with a heated fluid container 904. The heated fluid container 904 may have disposed therein various fluids configured to accept heat from the hot surface 902. For example, the fluid can be air, water, or various other fluids.

The heated fluid within the heated fluid container 904 can be ported to either a first adsorbent chamber 906A or a second adsorbent chamber 906B through valve 908A or 908B, respectively. The first adsorbent chamber 906A and the second adsorbent chamber 906B can include an adsorbent that is configured to adsorb a refrigerant. The refrigerant may be provided by a first evaporator/condenser 910A or a second evaporator condenser 910B through valve 912A or 912B, respectively.

During operation, the first adsorbent chamber 906A and the second adsorbent chamber 906B adsorb refrigerant from the first evaporator/condenser 910A or the second evaporator condenser 910B. The heated fluid is ported to the first adsorbent chamber 906A or the second adsorbent chamber 906B to cause the desorption of the refrigerant, cooling the heated fluid. In some examples, this may define a method to scavenge waste heat for the purpose of preheating an adsorbent chamber prior to desorption.

In some examples, the first adsorbent chamber 906A and the second adsorbent chamber 906B can be used at the same time to provide for emergency cooling. In other examples, the first adsorbent chamber 906A and the second adsorbent chamber 906B can be operated sequentially to provide for continuous cooling of the hot surface 902.

In some examples, the surface cooling system 900 can provide for redundancy. For example, if either of the first adsorbent chamber 906A or the second adsorbent chamber 906B becomes inoperative, the other adsorbent chamber may be operated to provide a degree of cooling.

Figure 10:
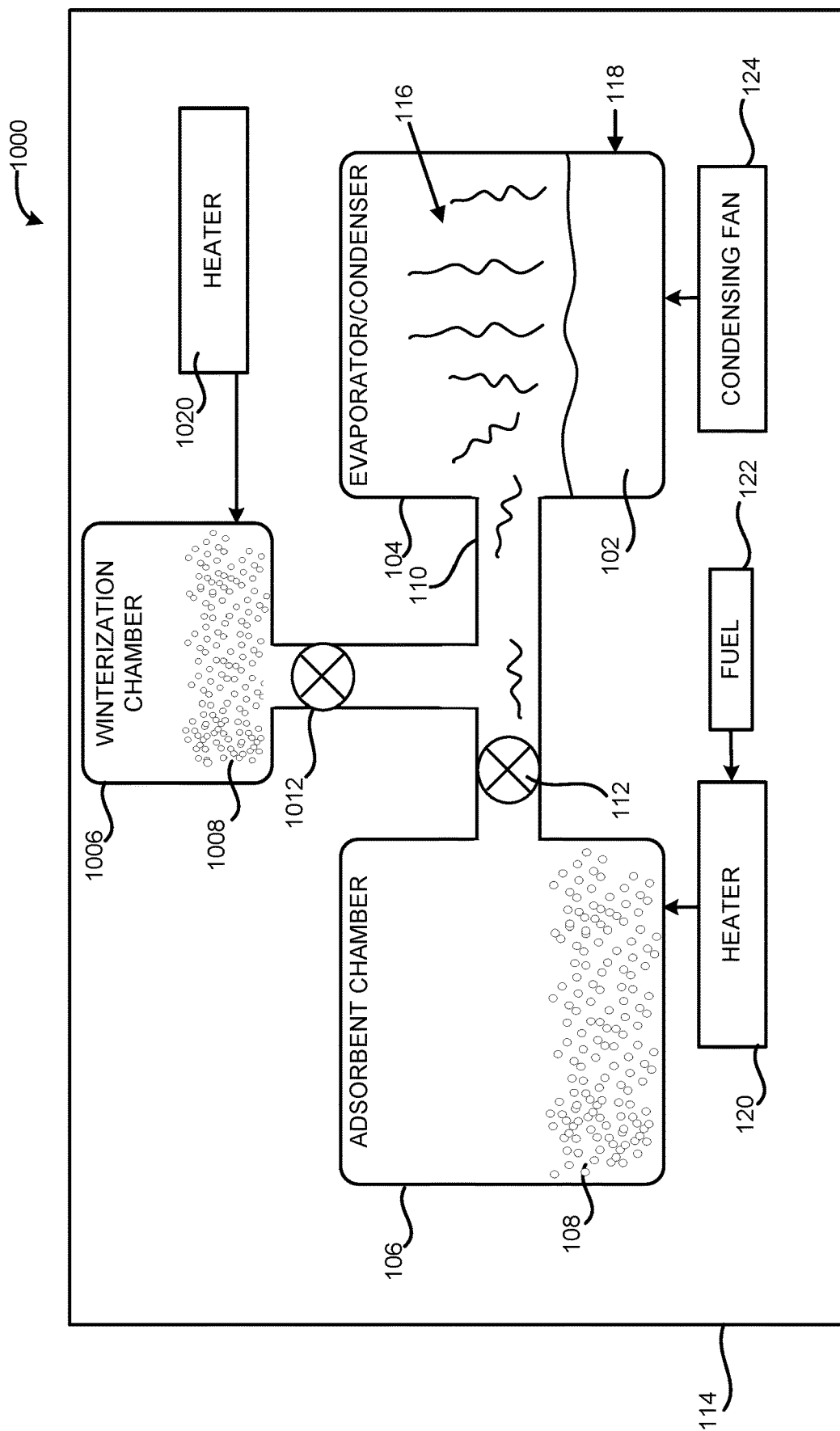
FIG. 10 is an illustration of a cooling system using a separate winterization chamber.

FIG. 10 is a cooling system 1000 that uses a chamber for winterization. In some examples, an adsorbent may have certain properties that allows it to be used during the operation of the system. However, in some examples, these adsorbents may not have properties that would be conducive to its use as an adsorbent for a winterized configuration. For example, adsorbents used during operations (e.g. operational adsorbents) may be less dense or have fewer locations for adsorption in their crystalline structure than adsorbents to be used in a winterization configuration (e.g. winterization adsorbents). In some examples, the winterization adsorbents may not be suitable or preferable to be used as an adsorbent during operations.

The cooling system 1000 is configured to take advantage of different benefits of adsorbents. The cooling system 1000 is a modification of the cooling system 100 of FIG. 1, and thus, the description of the operation of similarly labeled parts in FIG. 10 can be found in the description of FIG. 1. In FIG. 10, an additional adsorption chamber is provided, winterization chamber 1006. The winterization chamber 1006 has disposed therein winterization adsorbent 1008. In some configurations, the winterization adsorbent 1008 is an adsorbent having properties, or is designed, to maintain the refrigerant 102 for a winterization configuration. In a winterization configuration, the valve 112 may be closed and the valve 1012 may be opened. In this configuration, instead of the refrigerant 102 entering the adsorbent chamber 106, the refrigerant 102 is directed to the winterization chamber 1006. A heater 1020 may be provided to desorb the refrigerant 102 from the adsorbent 1008 when desired.

In some examples, both the winterization chamber 1006 and the adsorbent chamber 106 can be used. In some examples, a condition may be detected that requires an expedited adsorption of the refrigerant 102. In these examples, the winterization chamber 1006 can be used in concert with the adsorbent chamber 106 to attempt to decrease the time in which adsorption occurs.

Various aspect of the presently disclosed subject matter may be considered in view of the following clauses:

Clause 1: A cooling system, comprising: an evaporator containing a refrigerant; an adsorbent chamber fluidly coupled to the evaporator, the adsorbent chamber containing an adsorbent that adsorbs the refrigerant in a cooling mode and desorbs the refrigerant in a desorbing mode; and a control system configured to cause the adsorbent chamber to enter into the cooling mode and the recharging mode, receive a storage condition, determine if the cooling system is to enter into a storage configuration or a winterization configuration based on the storage condition, and in response to determining if the cooling system is to enter into the winterization configuration, cause the cooling system to enter into the winterization configuration.

Clause 2: The cooling system of clause 1, wherein the storage condition is an ambient temperature input at or below a predetermined ambient air temperature indicating a potential freezing condition of the refrigerant.

Clause 3: The cooling system of any of clauses 1 and 2, wherein the ambient temperature input comprises temperature data from a sensor or a weather report.

Clause 4: The cooling system of any of clauses 1-3, wherein the control system determines a rate of ambient air temperature decrease.

Clause 5: The cooling system of any of clauses 1-4, wherein the winterization configuration comprises a first configuration if the rate of ambient air temperature decrease is less than a first rate.

Clause 6: The cooling system of any of clauses 1-5, wherein the first configuration comprises opening at least one valve between the evaporator and the adsorbent chamber to provide for adsorption of the refrigerant in the adsorbent.

Clause 7: The cooling system of any of clauses 1-6, wherein the winterization configuration comprises a second configuration if the rate of ambient air temperature decrease is at or greater than the first rate but less than a second rate.

Clause 8: The cooling system of any of clauses 1-7, wherein the second configuration comprises adsorbing a portion of the refrigerant in the adsorbent chamber and at least a portion of the remaining refrigerant in a second adsorbent chamber.

Clause 9: The cooling system of any of clauses 1-8, wherein the winterization configuration comprises a third configuration if the rate of ambient air temperature decrease is at or greater than the second rate.

Clause 10: The cooling system of any of clauses 1-9, wherein the third configuration comprises applying additional heat to the evaporator to accelerate adsorption of the refrigerant in the adsorbent.

Clause 11: The cooling system of any of clauses 1-10, wherein the control system causes the adsorbent chamber to enter into the recharging mode when the control system determines that storage condition has cleared.

Clause 12: The cooling system of any of clauses 1-11, wherein the control system causes the cooling system to enter into the winterization configuration upon a detection of a predetermined ambient air pressure, a predetermined altitude, or a predetermined geographic location.

Clause 13: The cooling system of any of clauses 1-12, wherein the control system causes the cooling system to enter into the winterization configuration upon a receipt of a weather report that forecasts the ambient air temperature to be below a predetermined temperature.

Clause 14: The cooling system of any of clauses 1-13, wherein the control system receives a remote command to enter the winterization configuration.

Clause 15: The cooling system of any of clauses 1-14, further comprising at least one energy source thermally coupled to the adsorbent chamber and configured to heat the adsorbent chamber during the recharging mode.

Clause 16: The cooling system of any of clauses 1-15, wherein the at least one energy source comprises exhaust from an engine of a vehicle.

Clause 17: The cooling system of any of clauses 1-16, further comprising a winterization chamber to adsorb the refrigerant in the winterization configuration.

Clause 18: The cooling system of any of clauses 1-17, further comprising a transceiver to receive temperature data.

Clause 19: The cooling system of any of clauses 1-18, wherein the adsorbent is zeolite.

Clause 20: A method of operating a cooling system, the method comprising: providing an evaporator containing a refrigerant; providing an adsorbent chamber fluidly coupled to the evaporator, the adsorbent chamber containing an adsorbent that adsorbs the refrigerant in a cooling mode and desorbs the refrigerant in a desorbing mode; receiving a storage condition; determining, based on at least on the storage condition, if the cooling system is to enter a storage configuration or a winterization configuration; and in response to determining that the cooling system is to enter into the winterization configuration, causing the cooling system to enter into the winterization configuration.

Clause 21: The method of clause 20, wherein the storage condition is an ambient temperature input at or below a predetermined ambient air temperature indicating a potential freezing condition of the refrigerant.

Clause 22: The method of any of clauses 20-21, further comprising determining a rate of ambient air temperature decrease.

Clause 23: The method of any of clauses 20-22, wherein the winterization configuration comprises a first configuration if the rate of ambient air temperature decrease is less than a first rate, and wherein the first configuration comprises opening at least one valve between the evaporator and the adsorbent chamber to provide for adsorption of the refrigerant in the adsorbent.

Clause 24: The method of any of clauses 20-23, wherein the winterization configuration comprises a second configuration if the rate of ambient air temperature decrease is at or greater than the first rate but less than a second rate, and wherein the second configuration comprises adsorbing a portion of the refrigerant in the adsorbent chamber and at least a portion of the remaining refrigerant in a second adsorbent chamber.

Clause 25: The method of any of clauses 20-24, wherein the winterization configuration comprises a third configuration if the rate of ambient air temperature decrease is at or greater than the second rate, and wherein the third configuration comprises applying additional heat to the evaporator to accelerate the adsorption of the refrigerant in the adsorbent.

Clause 26: The method of any of clauses 20-25, further comprising causing the adsorbent chamber to enter into the recharging mode when the storage condition has cleared.

Clause 27: The method of any of clauses 20-26, further comprising thermally coupling at least one energy source to the adsorbent chamber to heat the adsorbent chamber during the recharging mode.

Clause 28: The method of any of clauses 20-27, wherein the at least one energy source comprises exhaust from an engine of a vehicle.

Clause 29: The method of any of clauses 20-28, wherein the at least one energy source comprises a central processing unit.

Clause 30: The method of any of clauses 20-29, wherein the adsorbent is zeolite.

Clause 31: The method of any of clauses 20-30, wherein the adsorbent is a metal organic framework.

Clause 32: The method of any of clauses 20-31, wherein the adsorbent is an electrically activated adsorbent.

Clause 33: A cooling system, comprising: a refrigerant; an adsorbent; a detector to detect a condition requiring a winterization configuration of the cooling system, whereby upon detection of the condition, the cooling system is reconfigured to cause the adsorption of substantially all of the refrigerant on an individual molecular basis in the adsorbent.

Clause 34: The system of clause 3, wherein the adsorbent is zeolite.

Clause 35: The system of any of clauses 33-34, wherein the adsorbent is a metal organic framework.

Clause 36: The system of any of clauses 33-35, wherein the adsorbent is an electrically activated adsorbent.

Clause 37: The system of any of clauses 33-36, wherein the condition is an ambient air temperature that may cause the refrigerant to freeze.

Clause 38: The system of any of clauses 33-37, wherein the condition is an unintentional disconnection of a component of the cooling system.

Based on the foregoing, it should be appreciated that technologies for a cooling system have been disclosed herein. Although the subject matter presented herein has been described in language specific to structural features, methodological and transformative acts, and specific machinery, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, aspects of which are set forth in the following claims.

What is claimed is:

1. A control system of a cooling system, the control system configured to:
   cause an adsorbent chamber to enter into a cooling mode and a recharging mode, the adsorbent chamber fluidly coupled to an evaporator, the adsorbent chamber containing an adsorbent that absorbs the refrigerant in a cooling mode and desorbs the refrigerant in the recharging mode,
   receive a storage condition,
   determine if the cooling system is to enter into a storage configuration or a winterization configuration based on the storage condition, wherein in the winterization configuration, substantially all of the refrigerant is stored on an individual basis within a crystalline structure of the adsorbent, and
   in response to determining if the cooling system is to enter into the winterization configuration, cause the cooling system to enter into the winterization configuration, wherein the control system determines a rate of ambient air temperature decrease, wherein the winterization configuration comprises:
      a first configuration if the rate of ambient air temperature decrease is less than a first rate, wherein the first configuration comprises opening at least one valve between the evaporator and the adsorbent chamber to provide for adsorption of the refrigerant in the adsorbent;
      a second configuration if the rate of ambient air temperature decrease is at or greater than the first rate but less than a second rate, wherein the second configuration comprises adsorbing a portion of the refrigerant in the adsorbent chamber and at least a portion of the remaining refrigerant in a second adsorbent chamber; and
      a third configuration if the rate of ambient air temperature decrease is at or greater than the second rate, wherein the third configuration comprises applying additional heat to the evaporator to accelerate adsorption of the refrigerant in the adsorbent.

2. The control system of a cooling system of claim 1, wherein the storage condition is an ambient temperature input at or below a predetermined ambient air temperature indicating a potential freezing condition of the refrigerant.

3. The control system of a cooling system of claim 2, wherein the ambient temperature input comprises temperature data from a sensor or a weather report.

4. The control system of a cooling system of claim 1, further comprising at least one energy source thermally coupled to the adsorbent chamber and configured to heat the adsorbent chamber during the recharging mode, wherein the at least one energy source comprises exhaust from an engine of a vehicle.

5. A method of operating a cooling system, the method comprising:
   providing an evaporator containing a refrigerant;
   providing an adsorbent chamber fluidly coupled to the evaporator, the adsorbent chamber containing an adsorbent that adsorbs the refrigerant in a cooling mode and desorbs the refrigerant in a recharging mode;

receiving a storage condition;

determining, based at least on the storage condition, if the cooling system is to enter a storage configuration or a winterization configuration, wherein in the winterization configuration, substantially all of the refrigerant is stored on an individual basis within a crystalline structure of the adsorbent;

in response to determining that the cooling system is to enter into the winterization configuration, causing the cooling system to enter into the winterization configuration; and determining a rate of ambient air temperature decrease, wherein the winterization configuration comprises based on a determination of the rate of ambient air temperature decrease:

a first configuration if the rate of ambient air temperature decrease is less than a first rate, wherein the first configuration comprises opening at least one valve between the evaporator and the adsorbent chamber to provide for adsorption of the refrigerant in the adsorbent;

a second configuration if the rate of ambient air temperature decrease is at or greater than the first rate but less than a second rate, wherein the second configuration comprises adsorbing a portion of the refrigerant in the adsorbent chamber and at least a portion of the remaining refrigerant in a second adsorbent chamber; and a third configuration if the rate of ambient air temperature decrease is at or greater than the second rate, wherein the third configuration comprises applying additional heat to the evaporator to accelerate adsorption of the refrigerant in the adsorbent.

6. The method of claim 5, wherein the storage condition is an ambient temperature input at or below a predetermined ambient air temperature indicating a potential freezing condition of the refrigerant.

7. A cooling system, comprising:

a refrigerant;

an adsorbent in an absorbent chamber;

a detector to detect a condition comprising an ambient air temperature that may cause the refrigerant to freeze requiring a winterization configuration of the cooling system, whereby upon detection of the condition, the cooling system is reconfigured to cause the adsorption of substantially all of the refrigerant on an individual molecular basis in the adsorbent; and a control system configure to determine a rate of ambient air temperature decrease, wherein, based on a determination of the rate of ambient air temperature decrease, the winterization configuration comprises:

a first configuration if the rate of ambient air temperature decrease is less than a first rate, wherein the first configuration comprises opening at least one valve between an evaporator and the adsorbent chamber to provide for adsorption of the refrigerant in the adsorbent;

a second configuration if the rate of ambient air temperature decrease is at or greater than the first rate but less than a second rate, wherein the second configuration comprises adsorbing a portion of the refrigerant in the adsorbent chamber and at least a portion of the remaining refrigerant in a second adsorbent chamber; and a third configuration if the rate of ambient air temperature decrease is at or greater than the second rate, wherein the third configuration comprises applying additional heat to the evaporator to accelerate adsorption of the refrigerant in the adsorbent.

8. The system of claim 7, wherein the adsorbent is zeolite.

9. The system of claim 7, wherein the adsorbent is a metal organic framework.

10. The system of claim 7, wherein the adsorbent is an electrically activated adsorbent.

* * * * *